INVENTOR:
Herbert Wolcott.
BY
ATTORNEY.

Patented Feb. 15, 1949

2,461,619

UNITED STATES PATENT OFFICE 2,461,619

AUXILIARY BACKWASH FOR WATER-TREATING SYSTEMS

Herbert Wolcott, Columbia, Mo.

Application January 12, 1945, Serial No. 572,526

3 Claims. (Cl. 210—144)

The present invention relates to water treating systems, and more particularly to water-softening apparatus of the character in which not only solid impurities are removed from a flow of water but the water also undergoes a softening treatment by being subjected to the action of suitable material such as zeolites, as by being passed through a bed of such material, whereby the hardening ingredients of the water undergo a change which neutralizes the hard properties of the water.

In the operation of apparatus of this type the granular material comprising the purifying and softening material itself becomes coated over with a portion of the impurities which adhere to said material and thereby render such coated particles of the material ineffective for any further action as a water-softening agent as well as being otherwise objectionable until such incrustation of impurities is removed and the bed of material thereby renovated.

The present invention therefore has for its primary purpose the provision of improved and more effective cleansing means, adapted to cooperate with the usual backwashing operation, and consisting of the application of a forceful water-jet action at those points of the bed of water-treating material where a most thorough and efficient purging of the impurities will be initiated and produced by a vigorous mechanical stirring of the material in combination with a thorough washing treatment of the same.

In carrying out this fundamental purpose of the invention I have devised a form of construction in which an auxiliary or secondary backwashing operation is produced by means of nozzle elements arranged to direct forcible jets at the base of the bed of water treating material and at such an angle as will produce a vigorous turbulent movement of the material at the same time as the main cleansing stream or backwash of water is passing through the bed of material.

It is also sought to provide satisfactory alternate forms of construction adapted for the practice of my invention, including types of nozzle devices arranged for convenient assembly and adjustment in operative position as well as removable for repair or the like.

With the foregoing general objects in view the invention will now be described by reference to the accompanying drawing illustrating suitable forms of construction adapted for the embodiment of my proposed improvements, after which those features and combinations deemed to be novel and patentable will be particularly set forth and claimed.

In the drawing—

Figure 1:
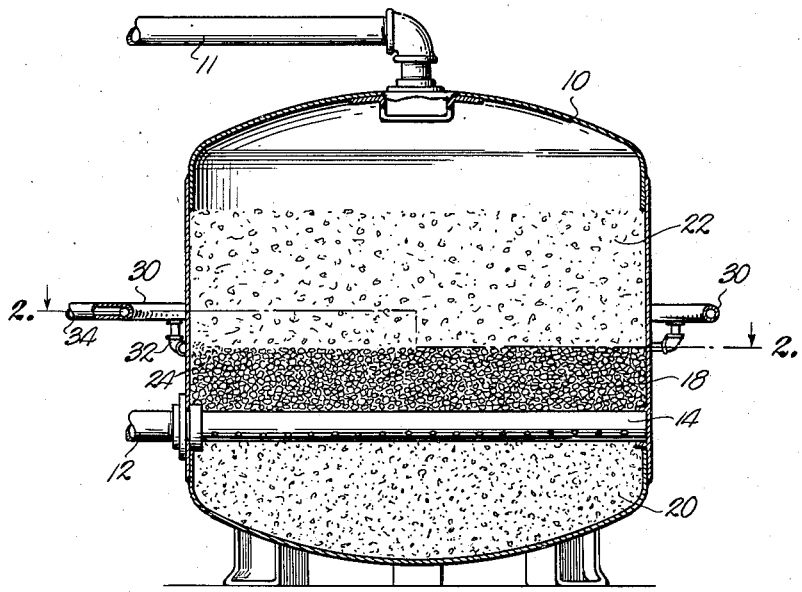
Figure 1 is a vertical sectional view illustrating a form of water-softening apparatus equipped with auxiliary backwash means embodying the present invention.

In the operation of water treating systems of the character for which the present improvements are intended, various expedients have been employed for cleansing and renovating the bed of water treating material, both in water filtering as well as in water softening operations. These expedients have consisted of water spraying or sprinkling means, and also water jet devices, both stationary and movable, or rotary; but so far as I am aware these various devices have not produced as efficient results as desired, in that the action, being only superficial in its application, is not sufficiently thorough to pervade the entire bed of water-treating material. Accordingly, I seek by means of the present improvements to provide a form of construction in which the operation of the cleansing jets is applied at such points and in such a manner as to combine with the usual primary flow of backwash water in producing a most complete and effective washing action wherein the cleansing operation is accompanied by a vigorous turbulent or boiling action of the whole bed of the water-treating material.

Referring now to the drawing in detail, the present improvements are illustrated in operative relation to a form of water softening apparatus comprising a tank 10 provided with a water supply connection 11 at its top and also with a conventional outlet or servicing pipe 12 at or near its bottom and having an interior water head portion 14, as shown. The bottom portion of the tank chamber is provided with the usual graded gravel bed 16, which may rest upon a bottom layer of concrete material 20. The bed 18 is of any appropriate depth, and in turn supports the bed of zeolites or equivalent water softening material 22, which fills most of the space within the upper portion of the tank chamber.

As one method of carrying out my invention, I provide a series of nozzle elements 24 mounted so as to project inwardly through the side wall of the tank 10 adjacent the bottom of the bed of zeolite material 22, or at approximately the surface of the gravel bed 18. These nozzle elements 24 may be adjustably mounted by means of bushings 26 which are threaded through coupling elements 28 or the like which are welded into the side wall of the tank and at such an angle that the nozzles all project eccentrically within the tank chamber and at the same angle to the radius, as clearly illustrated in Figure 2.

These nozzles 24 all communicate with a common water supply ring 30 through the medium of connections such as unions 31, L's 32, etc., said water ring 30 having a water feed connection 34, as shown.

By means of the foregoing construction, a relatively low water pressure, of around 40 lbs., will produce a plurality of forcible water jets, discharging at an angle from the several nozzles 24, with the result that as the zeolite bed is expanded by the main backwash flow (in the usual reversed water flow for washing or cleansing the bed of water-treating material), a vigorous turbulent or boiling action or movement is imparted to the whole bed of zeolite material 22. Hence as the zeolite particles are completely loosened up, each particle is subjected to a thorough cleansing action resulting from the combined operation of the backwash and a further scouring action in which the grains or particles are continuously rubbed against each other through the medium of the auxiliary rotary backwash movement just referred to; and the same effective cleansing operation is carried out from the bottom to the top or throughout the entire bed of said zeolite material. This operation continues throughout the period of the backwash treatment for cleaning purposes; but such period of time is materially reduced, as the increased efficiency of operation requires not only a somewhat lower water pressure but also a considerably shorter period of time for completing the operation.

Figures 2, 3, 4:
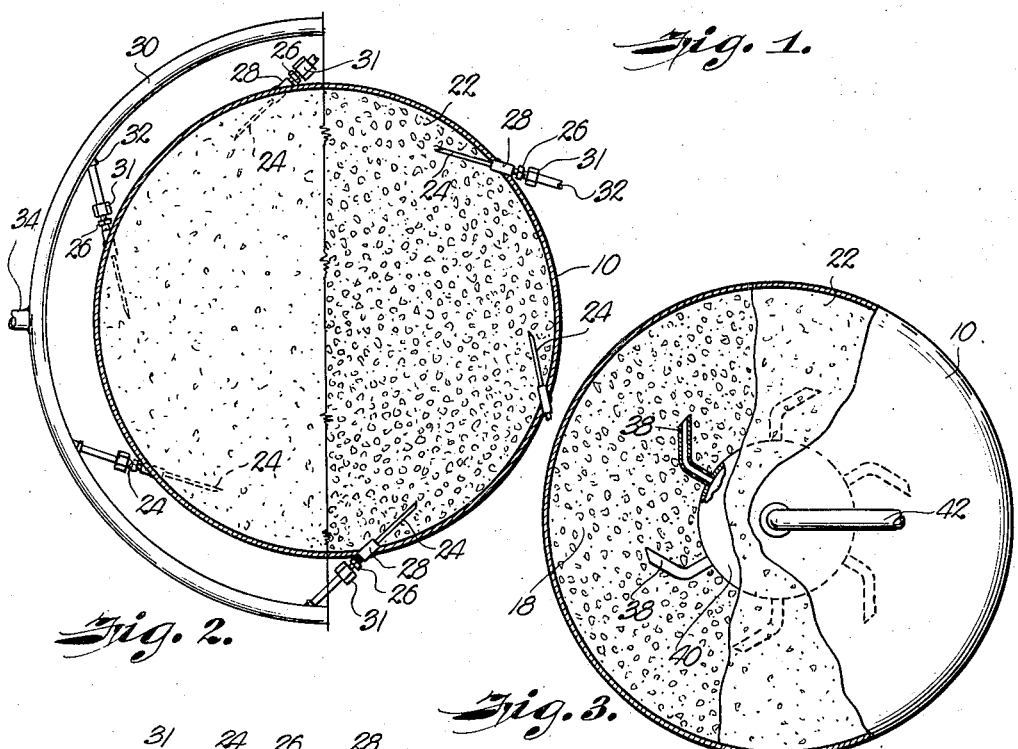
Figure 2 is a horizontal sectional view thereof, representing a section taken on the line 2—2 of Figure 1.
Figure 3 is a similar sectional view illustrating a modified form of the backwash construction.
Figure 4 is an enlarged detail view of one of the nozzles and its connections.

A modified form of construction for producing a similar result is illustrated in Figure 3. Here the nozzle elements 38 are carried by an interior tank chamber 40 which is located at the top of the gravel bed 18 and at the center of the bottom of the zeolite bed 22. A water feed pipe 42 leads to the center of said tank 40. These nozzle elements 38 are of angular form or contour as shown, so that the tips of the nozzles are adapted to direct the water jets at an appropriate angle to the radius of the tank chamber 10, and thereby produce the desired turbulent or boiling action within the zeolite bed 22, as in the case of the operation of the nozzles 24, as will be readily understood.

While I have illustrated and described preferred forms of embodiment of my invention, the same is clearly susceptible of many variations, and I therefore desire to expressly reserve the right to make such changes or modifications as may fairly fall within the spirit and scope of my invention as defined by the following claims.

Having thus described my invention, what I claim and desire to secure by Letters Patent is:

1. In a closed water treating system, a tank having a bed of granular water-treating material, pipe supply and servicing connections to the tank above and below said bed of treating material respectively, and a series of fixed water jet elements projecting in substantially coplanar relation from the interior wall of the tank at the bottom of said bed of material at equally spaced intervals about the center of said bed and having the discharge ends thereof all directed at angles intersecting radii from said center which are traversed by the jets from said water jet elements, for producing a joint water action operative to impart a rotary washing movement to the bottom portion of said bed of treating material.

2. In a closed water-treating system, a tank having a bed of granular water-treating material, pipe supply and servicing connections to the tank above and below said bed of treating material respectively, and a plurality of separate and individually adjustable water jet elements projecting in fixed position at various points through the sides of the tank at the bottom of said bed of material and in the same horizontal plane and having their discharge points equidistant from the center of said bed of material and all directed at angles intersecting radii from said center which are traversed by the jets from said water jet elements, for producing a joint water jet action operative to impart a rotary washing movement to the bottom portion of said bed of treating material.

3. A closed water-treating system comprising, a tank having a bed of granular water-treating material, pipe supply and servicing connections to the tank above and below said bed of material respectively, a water supply pipe surrounding said tank at approximately the level of the bottom of said bed of material, and a plurality of separate and individually adjustable water-jet elements communicating with said water supply pipe at various points and projecting in fixed relation through the sides of the tank at the bottom of said bed of material and at angles intersecting radii from the center of said bed of material which are traversed by the jets from said water jet elements and thereby imparting a rotary back wash movement to the bottom portion of said bed of treating material.

HERBERT WOLCOTT.

REFERENCES CITED

The following references are of record in the file of this patent:

UNITED STATES PATENTS

| Number | Name | Date |
|---|---|---|
| 418,186 | Jewell et al. | Dec. 31, 1889 |
| 598,383 | Murney | Feb. 1, 1898 |
| 695,399 | Kinsey | Mar. 11, 1902 |
| 949,455 | Usher | Feb. 15, 1910 |
| 1,762,585 | Pearl | June 10, 1930 |
| 2,309,916 | Palmer | Feb. 2, 1943 |
| 2,309,917 | Palmer | Feb. 2, 1943 |
| 2,364,775 | Brice | Dec. 12, 1944 |